US005489929A

United States Patent [19]

Vago

[11] Patent Number: 5,489,929
[45] Date of Patent: Feb. 6, 1996

[54] LIQUID-PROJECTION METHOD AND DEVICE FOR HIGH-RESOLUTION PRINTING IN A CONTINUOUS INK-JET PRINTER

[75] Inventor: Stephane Vago, Valence, France

[73] Assignee: Imaje S.A., Bourg les Valence, France

[21] Appl. No.: 903,573

[22] Filed: Jun. 24, 1992

[30] Foreign Application Priority Data

Jul. 5, 1991 [FR] France .................................. 91 08482

[51] Int. Cl.[6] .................................................. G01D 15/18
[52] U.S. Cl. ............................................... 347/55; 347/76
[58] Field of Search ................................ 347/74, 75, 76, 347/55

[56] References Cited

U.S. PATENT DOCUMENTS

| | | | |
|---|---|---|---|
| 4,032,924 | 6/1977 | Takano et al. | 347/76 |
| 4,068,241 | 1/1978 | Yamada | 347/75 |
| 4,272,771 | 6/1981 | Furukawa | 347/76 X |
| 4,318,111 | 3/1982 | Damouth | 347/76 |
| 4,350,986 | 9/1982 | Yamada | 347/75 |
| 4,364,058 | 12/1982 | Tamai et al. | 347/76 |
| 4,367,476 | 1/1983 | Sagae | 347/75 |
| 4,368,474 | 1/1983 | Togawa et al. | 347/76 |
| 4,427,986 | 1/1984 | Iyoda et al. | 347/76 |
| 4,491,852 | 1/1985 | Jinnai | 347/76 |
| 4,550,323 | 10/1985 | Gamblin | 347/76 |
| 4,638,326 | 1/1987 | Yamada et al. | 347/75 |
| 4,670,761 | 6/1987 | Yoshino et al. | 347/14 |
| 4,734,705 | 3/1988 | Rezanka et al. | 347/75 |
| 4,746,928 | 5/1988 | Yamada et al. | 347/75 |
| 5,049,899 | 9/1991 | Dunand et al. | 347/75 |

FOREIGN PATENT DOCUMENTS 365454 of 1990 European Pat. Off. .

*Primary Examiner*—Robert Beatty
*Attorney, Agent, or Firm*—Roland Plottel

[57] ABSTRACT

In a liquid projection method and a high-resolution printing device in a vibrationally excited continuous ink-jet printer, an ink jet is divided into drops in the vicinity of a charging device for the electrostatic charging of these drops creating an electrical field that is asymmetrical with respect to the axis of the jet. The method comprises a first step of creating a single microdrop at the upstream end of a main drop by the application of a charging voltage $V_M$ higher than the Rayleigh voltage to the charging device when this main drop appears. Then a second step of deflecting the microdrop to be used for the printing by the application, to the following main drop, of a charging voltage $V_c$, lower than the voltage $V_M$ and lower than the Rayleigh voltage, that can be modulated as a function of the path chosen for the microdrop towards the printing medium. The charging device can take the form of two half-planes intersecting each other in a direction parallel to the axis of the ink jet.

4 Claims, 4 Drawing Sheets

LIQUID-PROJECTION METHOD AND DEVICE FOR HIGH-RESOLUTION PRINTING IN A CONTINUOUS INK-JET PRINTER

BACKGROUND OF THE INVENTION

1. Field of the Invention

The present invention relates to a high-precision liquid projection method and its implementation by a high-resolution printing device in a stimulated continuous ink-jet printer.

A liquid-projection method such as this can therefore be applied to the field of high-resolution printing, but can also be applied to the field of the microdosing of substances used, for example, for the tracing of printed microcircuits or for the application of microdroplets of conductive bonder to fix electronic components on a support or to assemble particles of material according to a given geometry. Another promising application relates to the microdosing of chemical or biological agents in the manufacture of medicines.

2. Description of the Prior Art

In the field of high-resolution printers, a known method, described in the U.S. Pat. No. 4 068 241, is based on the appearance of small drops, called satellite drops, coming from a short filament or column of ink appearing at the upstream or downstream end of a main drop as a function of the value of the amplitude of the vibrational excitation leading to the break-up or separation of the ink jet. Before deflection, the ink jet is constituted by an alternating sequence of main drops and satellite drops, the ratio of the diameters being approximately equal to three. The satellite drops are then deflected according to a "binary" type of deflection technique: to each nozzle of the system, there corresponds only one dot of the pattern to be printed. As a consequence, numerous relative movements between the printing head and the medium to be printed are needed to cover a given surface, and this is a drawback.

As for the main drops, having no charge or low charge, they are recovered and recycled by means of a gutter towards the ink circuit.

Moreover, this printing method-has-another drawback due to its high sensitivity to the process of vibrational excitation of the ink jet. It is difficult to master the reproducibility of the characteristics of the vibrational excitation device without individual adjustment to the mechanical response of each device.

The patent application No. EP 0365454 filed by the Applicant describes a high-resolution printing method implemented in a vibrationally excited continuous ink-jet printer by means of satellite drops.

A continuous ink jet is fractionated into substantially equidistant and equidimensional drops $G_n$, During the passage of a main drop $G_n$ through charging electrodes, the application of an appropriate electrical voltage $V_n$ makes it possible, in certain specific conditions of use of the jet, to detach the upstream filament of this main drop $G_n$ and hence to create a satellite drop $S_n$. During the time of formation of the following main drop $G_{n+1}$, a voltage $V_{n+1}$ with an amplitude substantially equal to $V_n$ is applied so that the satellite drop $S_n$ remains in the jet between the drops $G_n$ and $G_{n+1}$ for a period of time that is long enough for it to cross the deflection electrical field located downstream and be thus deflected towards the printing medium. The main drops that have undergone little deflection are recycled in the ink circuit.

The implementation of this method has several drawbacks. First of all, there is the specific character of the conditions required for the desired use of the ink jet. Secondly, the frequency of use of the satellite drops is equal to only a third of that used for the vibrational excitation of the jet: indeed, the drop $G_{n+1}$, the electrical charge of which is substantially equal to that of the drop $G_n$, itself also generates a satellite drop not used for the printing since the value of its charge generally does not correspond to a dot of the pattern to be printed. Furthermore, the electrostatic confinement proposed places the satellite drop in a situation of unstable equilibrium that harms the precision of the deflection. This problem is furthermore aggravated by the length of the path travelled by these satellite drops which pass between the charging electrodes and then into the electrical deflection field.

The goal of the present invention is to overcome these drawbacks by providing a method for the projection of liquid by continuous jets, generating microdrops otherwise than by acting on the amplitude or the frequency of the excitation leading to the breaking up of the jet and not using any additional deflection means apart from that created by the interaction between the drops in the jet.

SUMMARY OF THE INVENTION

To this end, the object of the invention is a method for the high-resolution projection of liquid comprising a first step of dividing the liquid jet into drops, in the vicinity of a device for the electrostatic charging of the drops, creating an electrical field that is asymmetrical with respect to the axis of the jet, a second step of creating a single microdrop at the upstream end of a main drop by the application of a determined voltage $V_M$ to the charging device and, finally, a third step of deflecting the microdrop to be used by the application of another charging voltage $V_C$, lower than the voltage $V_M$, to the main drop that comes immediately after the microdrop.

The invention also relates to a high-resolution printing device in a stimulated-continuous ink-jet printer implementing the method described here above comprising:

- a pressurized ink container provided with at least one nozzle for the ejection of the ink jet in the direction of the axis of propagation of said ink jet;
- means for vibrationally exciting the ink jet in order to obtain a point of break-up into ink drops in the vicinity of an electrostatic charging device connected to a supply circuit;
- a detector connected to a circuit for the processing of the information elements acquired, said circuit being placed in the vicinity of the ink drops after their electrostatic charging by the device; and
- a gutter for the recovery of the drops not used for the printing, leading to the general ink feed circuit;
- wherein the electrostatic charging device comprises a single electrode creating an electrical field that is asymmetrical with respect to the axis of the ink jet.

BRIEF DESCRIPTION OF THE DRAWINGS

Other features and advantages of the invention shall appear from the following description of particular exemplary embodiments, said description being made with reference to the appended drawings of which.

The elements carrying the same references in the different figures fulfil the same functions designed to obtain the same results.

DETAILED DESCRIPTION OF THE INVENTION

The liquid projection method according to the invention shall be described through its application to a high-resolution printer.

Figure 1:
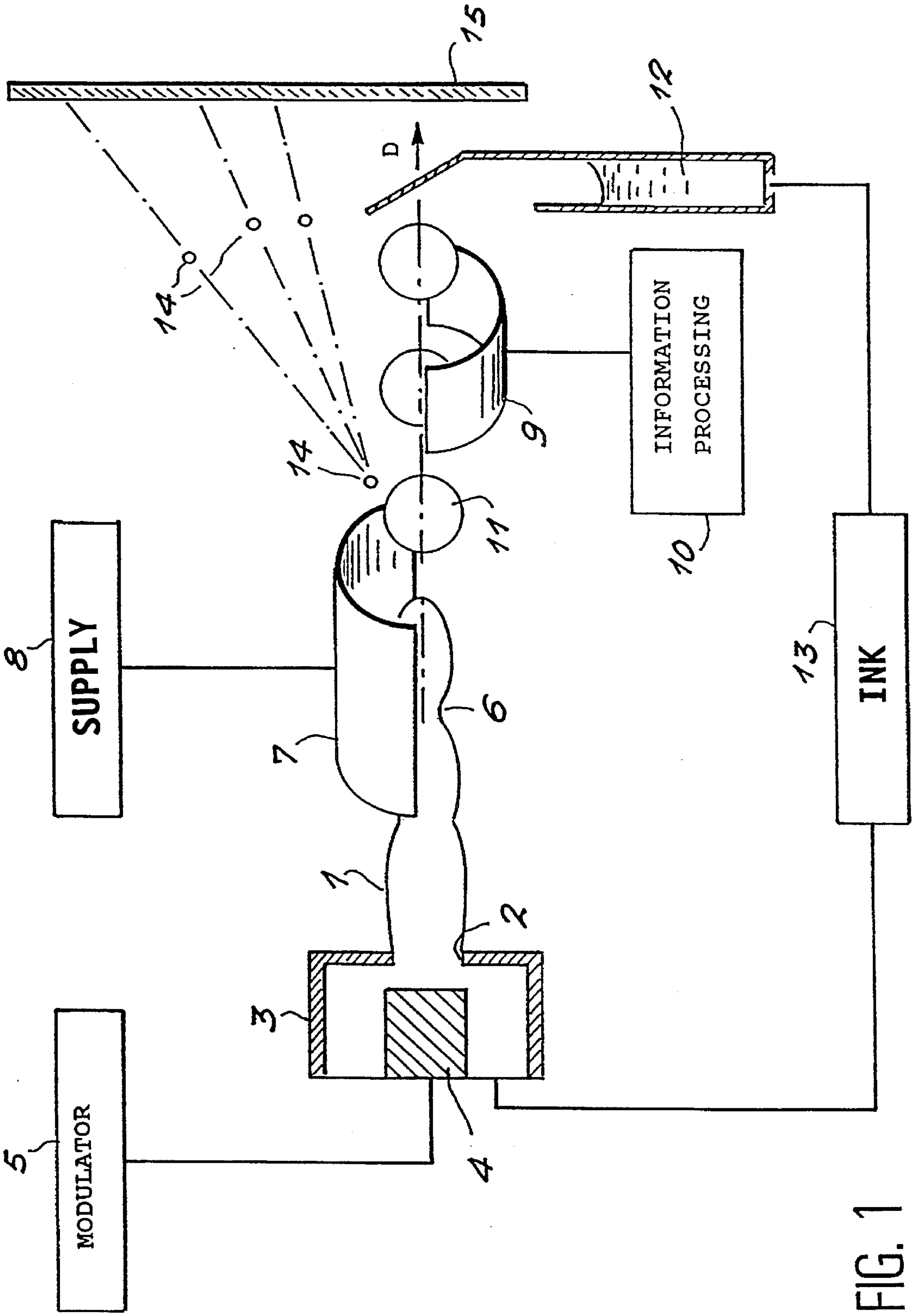
FIG. 1 shows a schematic view of an exemplary embodiment of a printing device in a vibrationally excited continuous ink-jet printer in which the method according to the invention is implemented.

FIG. 1 shows a schematic view of an exemplary embodiment of a printing device in a high-resolution continuous ink-jet printer implementing the method according to the invention.

The device comprises a pressurized ink container 3 provided with an ejection nozzle 2 whence an ink jet 1 escapes. A resonator circuit 4 electrically connected to a modulation circuit 5 vibrationally excites the ink jet 1 and determines its break-up point 6. In the vicinity of this break-up point, there is placed an electrical charging device 7 connected to its supply circuit 8, said device having the particular feature of inducing an electrical field that is asymmetrical with respect to the axis D of the jet. In order to achieve permanent synchronization between the-fragmentation of the ink jet 1 into drops 11 and the application of the charging voltages to these drops, a dectector 9 is placed in the vicinity of the path of the ink drops and is connected to a circuit 10 for the processing of the information that have been picked up by the detector.

The main ink drops 11 not used for the printing are recovered in a gutter 12 and directed by a conduit towards a general ink feed circuit 13.

As for the microdrops 14, the generation and deflection method of which shall be seen, they continue their trajectory until the printing medium 15. The projection method according to the invention uses a property of a drop of conductive liquid that was demonstrated by Lord Rayleigh in 1882 (see Adrian G. Bailey in *Electrostatic Spraying of Liquids*, Research Studies Press Ltd., 1988): there is an upper limit to the quantity of charge that can be received by a drop of conductive liquid. This limit is called Rayleigh's limit when the drop undergoes no external influence. Beyond this limit value of charge, the drop, which may be called the "parent drop" becomes unstable and ejects one or more highly charged microdrops, the effect of which is to bring the charge to below Rayleigh's critical value.

The method according to the invention controls and uses this phenomenon of electrostatic instability of a drop of conductive liquid in the case of a continuous and vibrationally excited jet with the aim of obtaining the ejection, in a perfectly repetitive way, of a single microdrop upstream from a parent drop.

Figure 2A:
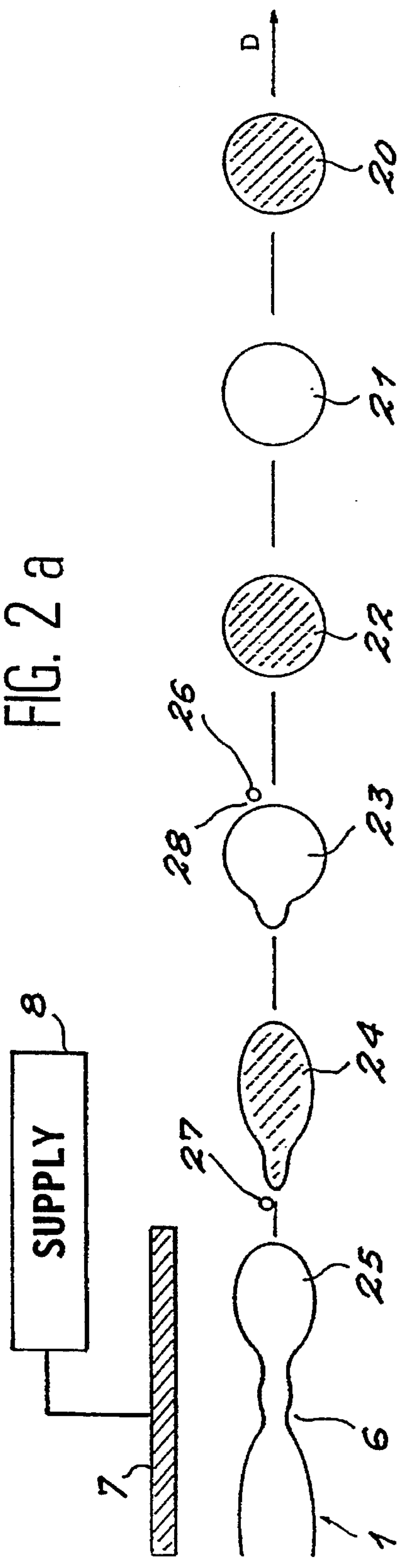
FIG. 2*a* is a diagram illustrating the process of creation of the microdrops according to the invention.

The diagram illustrating this process of the creation of the microdrops according to the invention is given in FIG. 2*a*.

In the vicinity of the point of break-up 6 of the jet of conductive liquid 1, namely ink in particular, the charging electrode device 7 produces an electrical field that is non-symmetrical with respect to the axis D of the jet and assigns the parent drops 20, 22 and 24 an electrical charge $V_M$ with a determined value so that each of them expels a microdrop, namely the microdrops 26 and 27 respectively associated with the parent drops 22 and 24, the microdrop coming from the drop 20 being no longer visible. Meanwhile, the main drops 21, 23 and 25 receive no electrical charge, so that the forces of electrostatic repulsion existing between the parent drops 22 and 24 and the associated microdrops 26 and 27 respectively cause the latter to be speedily captured by the uncharged main drops 23 and 25 respectively. Owing to the asymmetry induced by the geometry of the charging device 7 (a simple electrode in FIG. 2*a*) the point of capture 28 of a microdrop 26 by the main drop 23 that is immediately behind is also slightly deflected from the axis D of the ink jet.

Figure 2B:
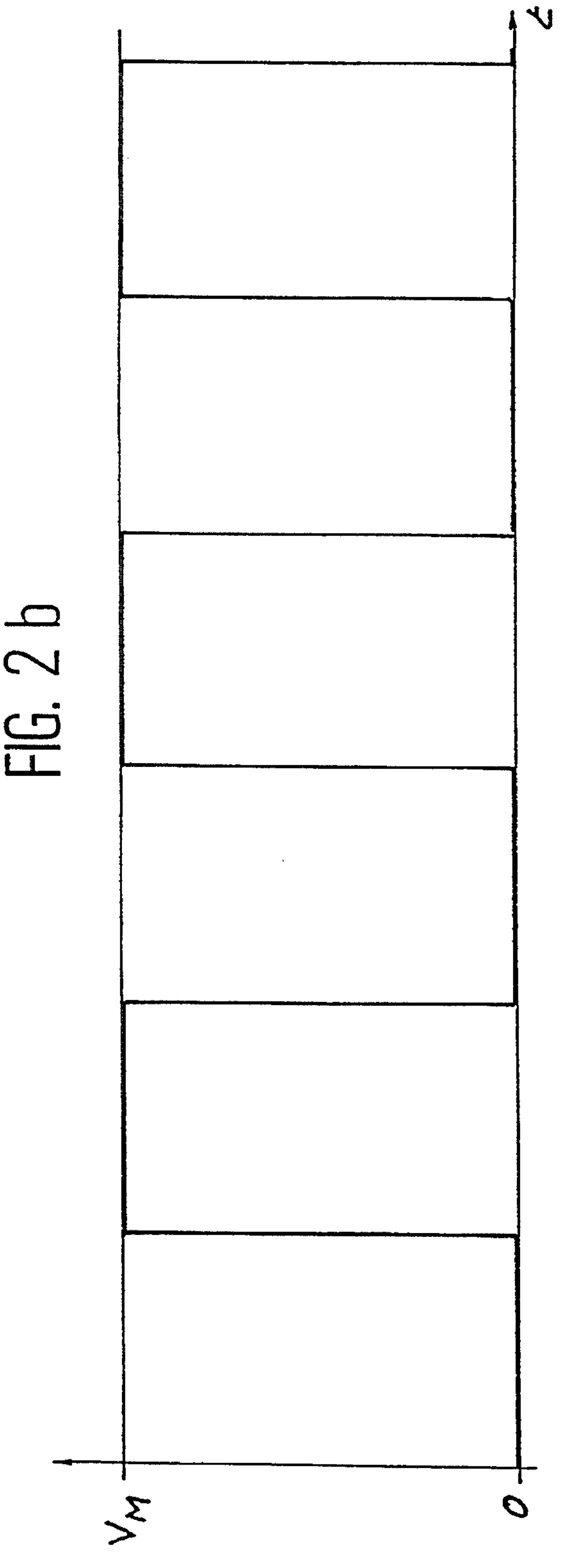
FIG. 2*b* is a graph illustrating the shape of the electrical charging voltages applied to the main ink drops, with a view to the creation of the printing microdrops.

The values of the electrical voltages, transmitted to the charging device 7 by its supply circuit 8, are shown in FIG. 2*b*. In this FIG. 2*b*, facing each drop of FIG. 2*a*, there is given an indication of the charging voltage that is assigned to it: $V_M$ for the parent drops and zero for the main drops.

According to the method of the invention, the deflection of the microdrops used for the printing is obtained by the electrical charging, in an appropriate way, of the main drop which immediately follows each parent drop having created a microdrop: a main drop such as this is called a deflection drop. Indeed, starting from a minimum value $Vc_{min}$ of the electrical voltage applied to the deflection drop, the electrostatic repulsion created between this drop and the microdrop preceding it, in the ink jet, is sufficient to eject the latter from the axis D of the jet, in the direction defined by the asymmetry of the electrical field created by the charging electrode 7. A continuous variation of the angle of the deflection thus obtained may be controlled by variation of the quantity of charge applied to the deflection drop.

If there is a minimum voltage $Vc_{min}$ for the charging of the deflection drops to obtain the deflection of the printing microdrops, there also exists a maximum voltage $Vc_{max}$ beyond which the strong electrostatic interaction between the deflection drops and the parent drops then prevents the expulsion of the microdrops by the latter, although the voltage $V_M$ applied to the parent drops is higher than the Rayleigh voltage value, defined strictly in the absence of any influence. Furthermore, this voltage Vc, applied to the deflection drops, is chosen so as to be lower than the Rayleigh voltage in such a way that they do not expel unusable microdrops, thus giving the method according to the invention a good printing speed.

Figure 3A:
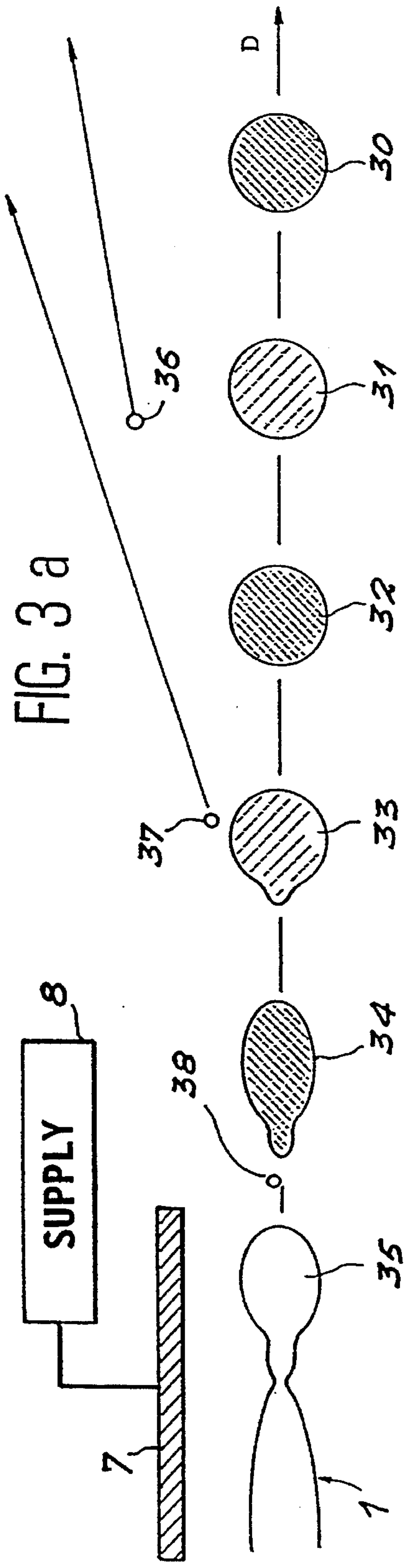
FIG. 3*a* is a diagram illustrating the process of creation and deflection of the microdrops according to the invention.
Figure 3B:
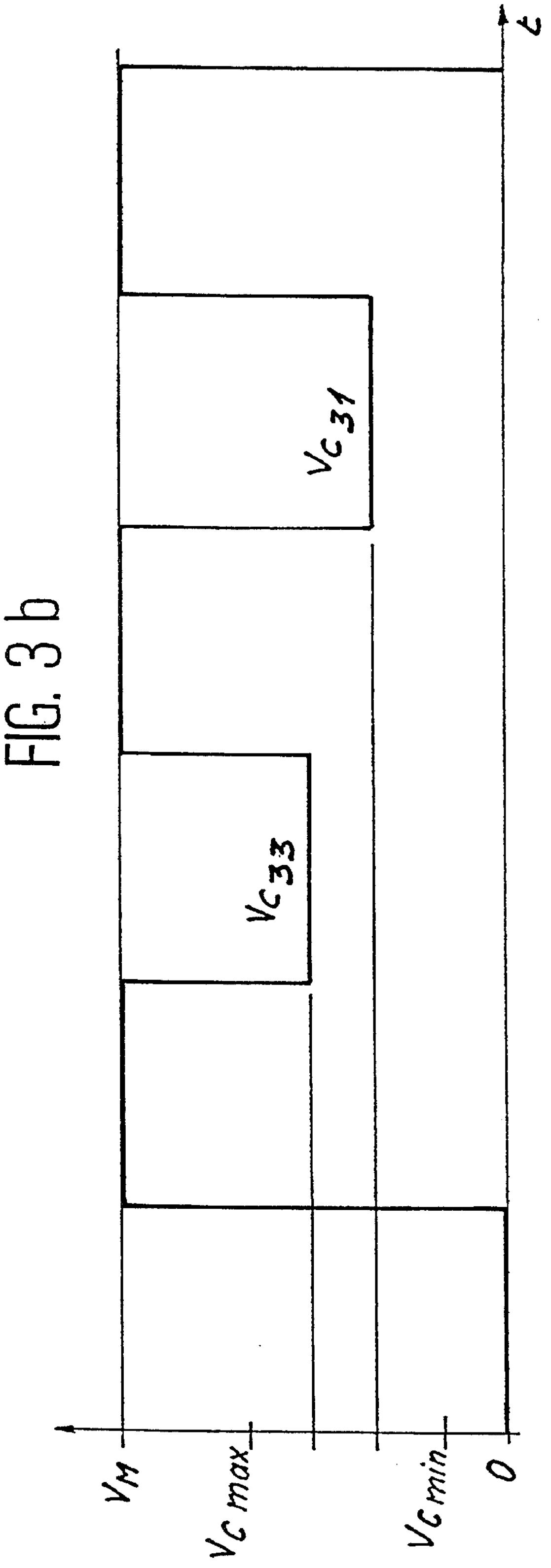
FIG. 3*b* is a graph illustrating the shape of the electrical chargings voltages applied to the ink drops, according to the invention.

FIG. 3*a* is a diagram illustrating the process of creation and deflection of the printing drops and FIG. 3*b* is the graph illustrating the values of the charging voltages applied to the drops of the ink jet according to the invention.

The ink jet 1 is broken up into main drops 30 to 35. The drops 30, 32 and 34 are electrically charged by a voltage $V_M$ greater than the Rayleigh voltage to create microdrops 36, 37 and 38 respectively. Two of these microdrops 36 and 37 are deflected respectively by the deflection drops 31 and 33 which are respectively charged by the voltages $Vc_{31}$ and $Vc_{33}$. Since the main drop 35 is not electrically-charged, it will absorb the microdrop 38 coming from the drop 34. It will be observed that the angle of deflection of the microdrops depends on the voltage Vc that is applied to the deflection drops. Thus, the charging voltage $Vc_{33}$ of the drop 33, which is higher than the charging voltage $Vc_{31}$ of the drop 31, explains the high deflection of the microdrop 37 as compared with the deflection of the microdrop 36.

As for the parent drops 30, 32 and 34, the deflection drops 31 and 33 and the uncharged drop 35, since they are not deflected towards the medium, they will be recovered by the gutter and recycled in the ink circuit.

It is seen therefore that the printing of a determined point on the medium 15 requires the participation of two drops of the ink jet associated with the following sequence: charging voltage above the critical value $V_M$, to create the printing microdrop, and then charging voltage below the critical value $V_c$ included between $Vc_{min}$ and $Vc_{max}$, to deflect this microdrop.

Figure 4A:
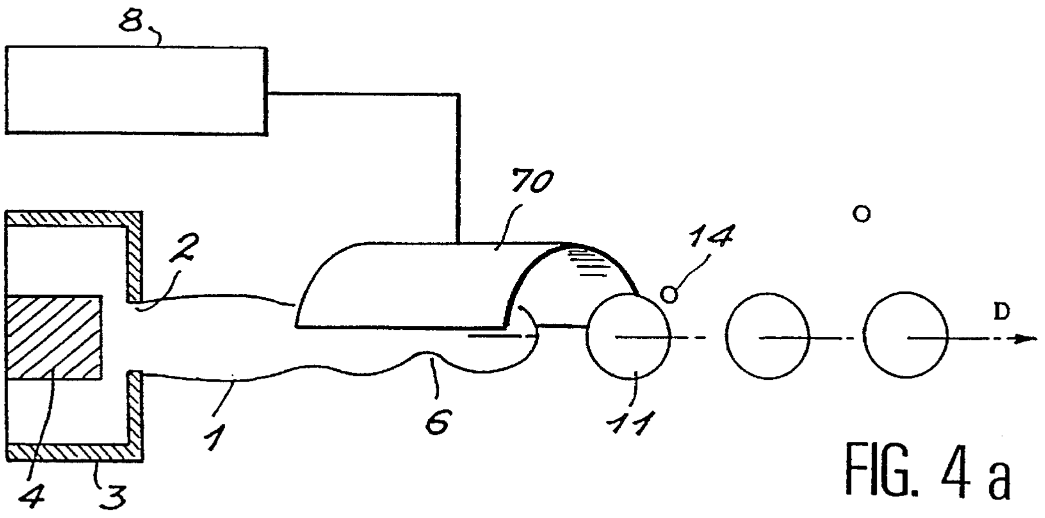
FIGS. 4*a* to 4*c* are drawings of exemplary embodiments of the device for the charging of the ink drops according to the invention.
Figure 4B:
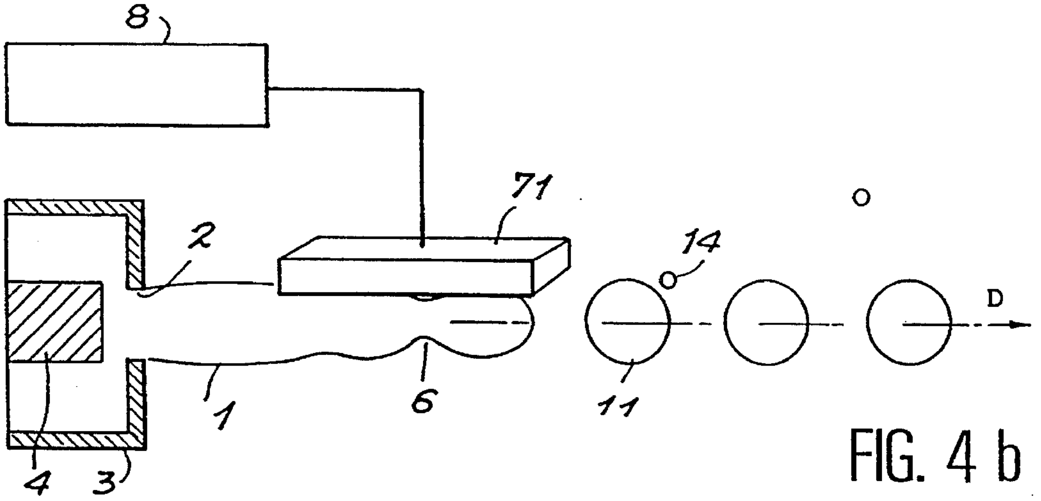
Figure 4C:
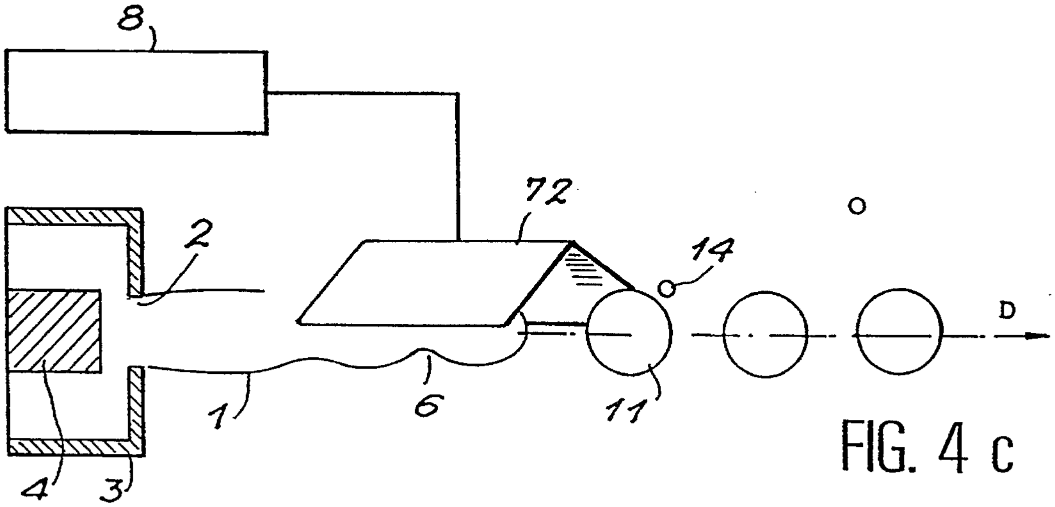

FIGS. 4*a* to 4*c* give schematic views of exemplary embodiments of the device for the charging of the ink drops, according to three different geometries but all inducing an electrical field that is non-symmetrical with respect to the axis D of the ink jet 1.

According to the first example of FIG. 4*a*, the electrode has the shape of a semi-cylinder with an axis that is the same as the axis D of the ink jet 1. The electrostatic influence is high between this electrode 70 and the jet 1, enabling the operation of the printer with low voltages for the charging of the ink drops. According to the second example of FIG. 4*b*, the electrode 71 has the shape of a single rectangular plate, with a longitudinal axis parallel to the axis D of the jet 1. The electrostatic influence between the electrode 71 and the jet 1 is lower than in the previous case but the simple shape and compactness of the electrode facilitates its manufacture and high density integration.

The third example, according to FIG. 4*c*, represents a compromise between the efficiency of the first geometry and the simplicity of the second one. The charging electrode 72 is constituted by two half-planes intersecting each other in a direction parallel to the axis D of the ink jet.

The method of the invention has the advantage of enabling an impact of the liquid drops on the medium that is far smaller than the diameter of the ejection nozzle, consequently increasing the precision of the implementing device, hence the resolution of the printer in the particular case described.

It also enables a high integration of the liquid projection system with lower tolerances in comparison with its performances.

Furthermore, by using no additional deflection means, apart from that created by the electrostatic interaction between the drops of the jet, the method makes it possible to reduce the number of elements of the liquid spraying head (a single charging electrode is enough). Another advantage lies in the printing of only the microdrops with low sensitivity to the variations in the amplitude of vibrational excitation of the ink jet, since these microdrops are not generated by action on the amplitude or the frequency of the excitation leading to the break-up of the ink jet.

Another major advantage of the method according to the invention is that it enables the printing of ink drops in screen mode, unlike the methods described in the prior art, i.e. a single ink jet enables the printing of several lines of dots corresponding to the modulation of the deflection of said drops.

The invention makes it possible to envisage promising industrial applications. First of all the extremely small diameter of the printing microdrops permits the designing of a printer that can be used in every field that requires almost photographic printing quality. A prototype printer made by the Applicant has been used to obtain printing microdrops with a diameter of less than 10 microns for an ejection nozzle diameter of 35 microns.

Furthermore, the possibility of selectively modulating the angle of deflection of each printing microdrop will make it possible, by means of an appropriate control algorithm, to obtain very high quality printing on media having complex shapes.

The industrial decoration sector, which calls for both high resolution and high printing speed, can also be approached since the small number and the simplicity of the elements required for the printing method according to the invention permit their high density integration into multijet modules.

The invention is in no way restricted to the embodiment that has just been described. It scope naturally covers the equivalent techniques of the means and their combinations if they are carried out in the spirit of the invention and implemented within the framework of the following claims. It is thus that the invention can be implemented in a printing device with several simultaneous continuous ink jets which will be ejected by a same number of nozzles associated with a same container.

The invention can also be applied in the tracing of printed circuits, the assembling of electronic components or the manufacture of medicines as stated hereabove.

What is claimed is:

1. A liquid projection method implemented in a vibrationally excited continuous jet device comprising a first step of dividing a jet coming from a nozzle into drops in a vicinity of a device for electrostatically charging said drops, wherein said method comprises the following other successive steps of:

creating, in said electrostatic charging device, an electrical field that is asymmetrical with respect to an axis of propagation of the jet from the nozzle, creating a single microdrop at an upstream end of a main drop by the application, to said electrostatic charging device, of a determined charging voltage ($V_M$) higher than the Rayleigh voltage when said main drop appears, and deflecting said microdrop by the application of another charging voltage $V_c$, lower than the voltage $V_M$ and lower than the Rayleigh voltage, to the main drop that comes immediately after the created microdrop.

2. A projection method according to claim 1, wherein the charging voltage (Vc), used for the deflection of said microdrop, can be modulated in amplitude as a function of the path chosen for said microdrop towards a printing medium.

3. A high-resolution printing device in a vibrationally excited continuous ink-jet printer comprising:

a pressurized ink container provided with at least one nozzle for ejection of an ink let in a direction of an axis of propagation of said jet;

means for vibrationally exciting the jet so as to obtain a point of break-up into ink drops in a vicinity of an electrostatic charging device connected to a supply circuit said electrostatic charging device providing electrostatic charging of the ink drops;

a detector connected to a circuit for processing information that has been picked up by the detector, sad detector being placed in the vicinity of the ink drops after their electrostatic charging by the charging device;

a gutter for the recovery of the drops not used for printing;

wherein the charging device comprises a single electrode creating an electrical field that is asymmetrical with respect to the axis of the ink jet; and wherein the charging electrode takes the form of two half-planes intersecting each other in a direction parallel to the axis of the ink jet.

4. A high-resolution ink-jet printer comprising:

a pressurized ink container (3) having a nozzle for ejection of an ink jet in a direction of an axis of propagation of said jet;

an electrostatic charging device (7, 8) located down stream from said jet and spaced apart from said jet axis;

a circuit (3, 4) vibrationally exciting the jet so as to break-up the jet into ink drops in a vicinity of the electrostatic charging device (7);

said electrostatic charging device providing electrostatic charging of the ink drops in pairs of drops with a first drop of each pair being charged to a voltage $V_m$ higher than the Rayleigh voltage, and a second drop of said pair being charged to a voltage $V_c$ lower than the Rayleigh voltage; and said device (7, 8) comprises an electrode (7) creating an electrical field that is asymmetrical with respect to the axis of the ink jet for deflecting said charged ink drops;

a detector (9) connected to a circuit (10) for processing information that has been picked up by the detector, said detector being located in the vicinity of the ink drops after their electrostatic charging by the charging device; and a gutter for the recovery of the drops not used for printing; and whereby said first drop throws off a charged satellite drop due to said charge $V_m$ of said first drop; and said asymmetrical field initially deflects said charged drops; and said second drop further deflects said satellite drop of said first drop in accordance with the charge on said second drop.

* * * * *